(12) United States Patent
Kampe et al.

(10) Patent No.: US 6,854,069 B2
(45) Date of Patent: Feb. 8, 2005

(54) METHOD AND SYSTEM FOR ACHIEVING HIGH AVAILABILITY IN A NETWORKED COMPUTER SYSTEM

(75) Inventors: Mark A. Kampe, Los Angeles, CA (US); Michel Gien, Feucherolles (FR); David Penkler, Meylan (FR); Christian Jacquemot, Saint-Germain-les-Corbeil (FR); Frederic Herrmann, Palo Alto, CA (US); Francois Armand, Noisy-le-Roi (FR); Jean-Marc Fenart, Montigny le Bretonneux (FR); David F. Campbell, Mountain View, CA (US); Lawrence E. Baltz, Grenoble (FR)

(73) Assignee: Sun Microsystems Inc., Palo Alto, CA (US)

( * ) Notice: Subject to any disclaimer, the term of this patent is extended or adjusted under 35 U.S.C. 154(b) by 719 days.

(21) Appl. No.: 09/845,770

(22) Filed: May 2, 2001

(65) Prior Publication Data

US 2002/0007468 A1 Jan. 17, 2002

Related U.S. Application Data

(60) Provisional application No. 60/201,099, filed on May 2, 2000.

(51) Int. Cl.[7] .................................................. G06F 11/00
(52) U.S. Cl. ............................... 714/4; 714/47; 714/48
(58) Field of Search ................................... 714/4, 47, 48

(56) References Cited

U.S. PATENT DOCUMENTS

| | | | |
|---|---|---|---|
| 5,740,348 A | 4/1998 | Cunliffe et al. | 395/182.04 |
| 6,145,094 A | 11/2000 | Shirriff et al. | 714/11 |
| 6,163,856 A | 12/2000 | Dion et al. | 714/4 |
| 6,292,905 B1 * | 9/2001 | Wallach et al. | 714/4 |
| 6,308,282 B1 * | 10/2001 | Huang et al. | 714/4 |
| 6,360,331 B2 * | 3/2002 | Vert et al. | 714/4 |
| 6,446,134 B1 * | 9/2002 | Nakamura | 719/313 |

FOREIGN PATENT DOCUMENTS

| | | |
|---|---|---|
| DE | 43 39 122 | 5/1995 |
| WO | WO 96/08098 | 3/1996 |

OTHER PUBLICATIONS

H. V. Jagadish et al., "Dalí: A High Performance Main Memory Storage Manager," Proceedings of the 20th VLDB Conference Santiago, Chile 1994, pp. 1–12.

P. Bohannon et al., "The Architecture of the Dalí Main Memory Storage Manager," Multimedia Tools and Applications, vol. 4, No. 2, pp. 115–151 (reprinted as pp. 1–36), Mar. 1997.

* cited by examiner

*Primary Examiner*—Nadeem Iqbal
*Assistant Examiner*—Timothy M. Bonura
(74) *Attorney, Agent, or Firm*—William J. Kubida; Kent A. Lembke; Hogan & Hartson LLP

(57) ABSTRACT

The present invention describes a method and system for achieving high availability in a networked computer system. In particular, the method for achieving high-availability is executed in a networked computer system. The networked computer system includes nodes connected by a network. The method includes using high-availability-aware components to represent hardware and software in the networked computer system, managing the components to achieve a desired level of redundancy, and monitoring health of the networked computer system, including health of components and nodes. The method further includes detecting a failure in the networked computer system. Failures detected by the method include failures of a component and/or node. Finally, the method includes recovering from the failure by performing an appropriate failure recovery procedure.

25 Claims, 11 Drawing Sheets

METHOD AND SYSTEM FOR ACHIEVING HIGH AVAILABILITY IN A NETWORKED COMPUTER SYSTEM

CROSS REFERENCE TO RELATED APPLICATION

This application claims the benefit of U.S. Provisional Application No. 60/201,099, which was filed on May 2, 2000, and which is hereby incorporated by reference.

BACKGROUND OF THE INVENTION

1. Field of the Invention

The present invention relates to a method and system for achieving high availability in a networked computer system. In particular, the present invention relates to a method and system that uses components to achieve high availability of software and hardware that comprise a networked computer system.

2. Discussion of the Related Art

Networked computer systems enable users to share resources and services. One computer can request and use resources or services provided by another computer. The computer requesting and using the resources or services provided by another computer is typically known as a client, and the computer providing resources or services to another computer is known as a server.

A group of independent network servers may be used to form a cluster. Servers in a cluster are organized so that they operate and appear to clients, as if they were a single unit. A cluster and its network may be designed to improve network capacity, by among other things, enabling the servers within a cluster to shift work in order to balance the load. By enabling one server to take over for another, a cluster helps enhance stability and minimize downtime caused by an application or system failure.

Today, networked computer systems including clusters are used in many different aspects of our daily lives. They are used, for example, in business, government, education, entertainment, and communication. As networked computer systems and clusters become more prevalent and our reliance on them increases, it has become increasingly more important to achieve the goal of always-on computer networks, or "high availability" systems.

High availability systems need to detect and recover from a failure in a way transparent to its users. For example, if a server in a high availability system fails, the system must detect and recover from the failure with no or little impact on clients.

Various methods have been devised to achieve high availability in networked computer systems including clusters. For example, one method known as triple modular redundancy, or "TMR," is used to increase fault tolerance at the hardware level. Specifically, with TMR, three instances of the same hardware module concurrently execute and by comparing the results of the three hardware modules and using the majority results, one can detect a failure of any of the hardware modules. However, TMR does not detect and recover from a failure of software modules. Another method for achieving high availability is software replication, in which a software module that provides a service to a client is replicated on at least two different nodes in the system. While software replication overcomes some disadvantages of TMR, it suffers from its own problems, including the need for complex software protocols to ensure that all of the replicas have the same state.

Methods and tools used to achieve high availability often lack flexibility. For example, such tools and methods may require a specific operating system. They may be limited to certain hardware platforms, interconnect technologies and topologies, or network protocols. In addition, they often support a limited number of redundancy models.

This lack of flexibility makes existing methods less desirable for today's computing environment—which includes a wide range of operating systems, software, hardware platforms, and networks, etc. Further, existing methods and tools for achieving high availability do not take into account diverse needs of users of high availability systems.

Thus, there is a need for a system and method for achieving high availability in a networked computer system that can support a wide range of computing environments and needs.

SUMMARY OF THE INVENTION

The present invention provides a system and method for achieving high availability in a networked computer system. In particular, the present invention provides a system and method for using high-availability-aware components to achieve high availability in a networked computer system.

To achieve these and other advantages and in accordance with the purposes of the present invention, as embodied and broadly described herein, the present invention describes a method for achieving high availability in a networked computer system. The networked computer system includes nodes that are connected by a network. The method includes using components and maintaining a desired level or levels of redundancy of the components. The components represent or correspond to hardware or software in the networked computer system and are high-availability aware.

In another aspect, the invention includes a method for achieving high availability that is executed in a networked computer system. The networked computer system includes nodes that are connected by a network. The method includes using high-availability-aware components to represent hardware and software in the networked computer system, managing the components to achieve a desired level or levels of redundancy, and monitoring health of the networked computer system, including health of the components and the nodes. The method further includes detecting a failure in the networked computer system. Failures detected by the method include component and/or node failures. Finally, the method includes recovering from the failure by performing an appropriate failure recovery procedure.

In yet another aspect, the invention includes a system for making a networked computer system highly available using components. The components are high-availability aware and represent software and hardware in the networked computer system. The networked computer system includes nodes that are connected by a network. The system includes: (1) means for providing component services; (2) means for providing availability management services; (3) means for providing distributed system services; (4) means for providing platform specific services; and (5) means for providing external management services.

In further aspect, the invention includes a system for making a networked computer system highly available. The networked computer system includes: (1) means for using high-availability-aware components to represent hardware and software in the networked computer system; and (2) means for maintaining a desired level or levels of the redundancy of the components.

In yet further aspect, the invention includes a system for making a networked computer system highly available. The networked computer system includes nodes that are connected by a network. The system includes: (1) means for using high-availability-aware components to represent hardware and software in the networked computer system; (2) means for managing the components to achieve a desired level or levels of redundancy; (3) means for monitoring health of the networked computer system, including health of the components and the nodes; (4) means for detecting a failure in the networked computer system, including a node failure and/or a component failure; and (5) means for recovering from the failure by performing an appropriate failure recovery procedure.

In another aspect, the invention includes a computer program product configured to achieve high-availability in a networked computer system with nodes that are connected by a network. The computer program product includes computer readable program codes configured to: (1) use high-availability-aware components to represent hardware and software in the networked computer system; and (2) maintain a desired level or levels of redundancy of the components. The computer program product also includes a computer readable medium having the computer readable program codes embodied therein.

The invention also includes a computer-readable storage medium comprising program instructions for achieving high availability in a networked computer system. The networked computer system includes nodes and a storage device. The program instructions execute in the networked computer system and are operable to implement the steps of: (1) using high-availability-aware components to represent software and hardware in the networked computer system; and (2) maintaining a desired level or levels of redundancy for the components.

Finally, the invention also includes a computer program product configured to achieve high availability in a networked computer system. The networked computer system includes nodes that are connected by a network. The computer program product includes computer readable program codes configured to: (1) use high-availability-ware components to represent hardware and software in the networked computer system; (2) manage the high-availability-aware components to achieve a desired level or levels of redundancy; (3) monitor health of the networked computer system, including health of the components and health of the nodes; (4) detect a fault in the networked computer system, including a component failure and a node failure; and (5) recover from the failure by performing an appropriate failure recovery procedure. The computer program product also includes a computer readable medium having the computer readable program codes embodied therein.

Additional features and advantages of the invention are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description, serve to explain the principles of the invention. In the drawings.

DETAILED DESCRIPTION OF THE PREFERRED EMBODIMENTS

Reference is now made in detail to the preferred embodiments of the present invention, examples of which are illustrated in the accompanying drawings.

Figure 1:
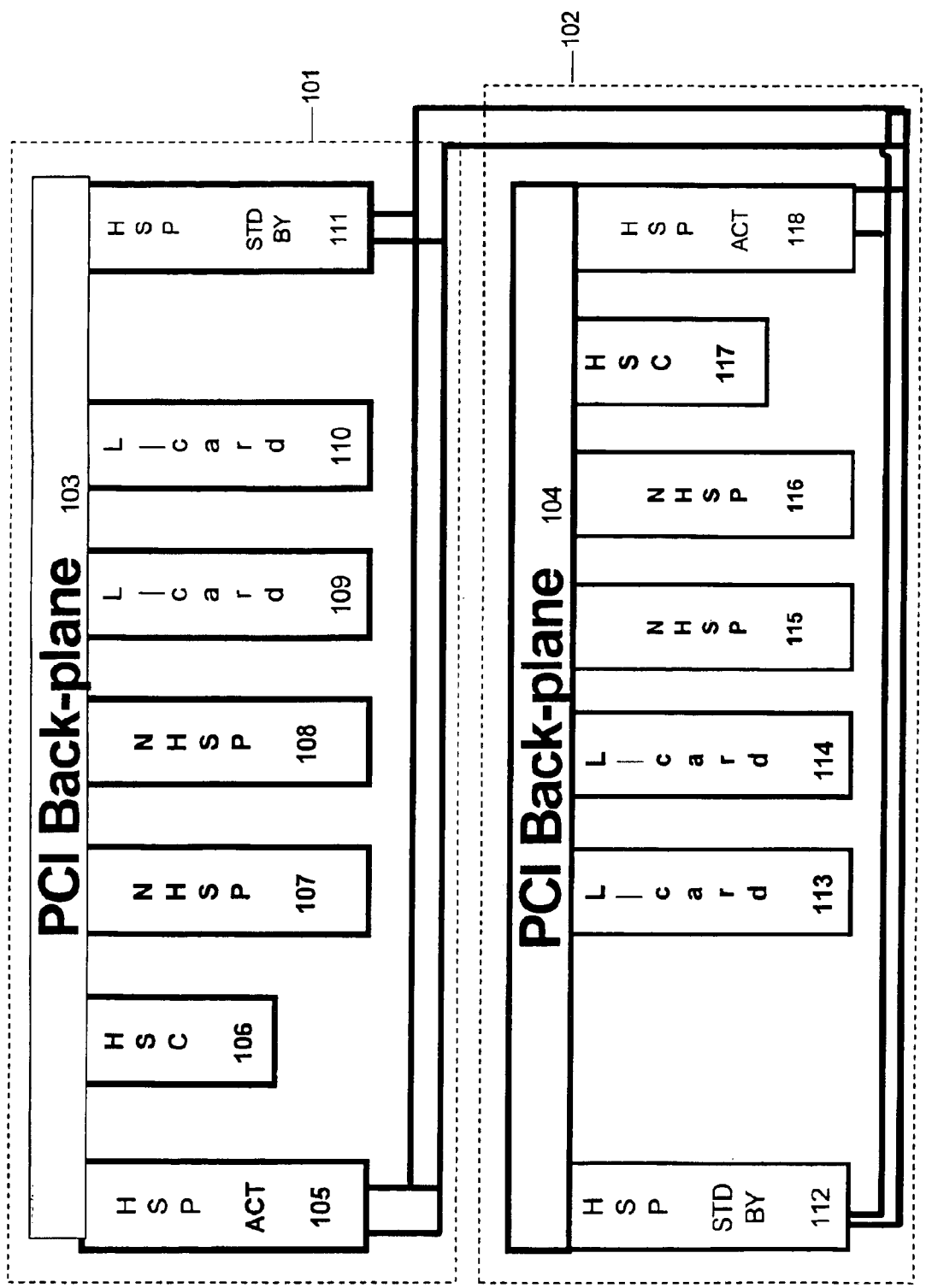
FIG. 1 is a simplified representational drawing of a networked computer system that may serve as an operating environment for the present invention.

FIG. 1 is a simplified representational drawing of a networked computer system in which the present invention may be used. Specifically, the networked computer system of FIG. 1 is a cluster. It is important to note that the cluster shown in FIG. 1 is merely an example and that the present invention may be utilized in much larger or smaller clusters or networked computer systems. In other words, the present invention does not depend on the architecture of an underlying cluster or a networked computer system.

The cluster of FIG. 1 has two independent shelves 101 and 102, that are interconnected by a network. Each shelf may include: (1) one cPCI back plane (103 and 104); (2) redundant power supplies and fans; (3) one dual-ported, hot-swap controller ("HSC") (106 and 117), which manages the power to the slots, as well as the power supplies, fans, and environment alarms; (4) a bus-switch, permitting the bus to be managed by one of two host-slot processors; (5) two hot-swap-able host-slot processors ("HSPs"), one active (105 and 118) and one standby (111 and 112); (6)) two line cards ("L-cards"), which are hot-swap-able (109, 110, 113, and 114); and (7) two non-host-slot processors ("NHSPs") (107, 108, 115, and 116).

Nodes within a single shelf would communicate across the cPCI back plane. Communication between nodes on different shelves may use a network, which, for example, can be dual-redundant 100 MB ethernets. The HSP nodes would act as gateways, relaying packets between their cPCI back planes and the ethernets. Further, L-cards may be made 2N-redundant, for example, by making the L-cards 109 and 114 standbys for the L-cards 113 and 110, respectively. NHSPs may be made N+1 redundant, for example, by making the NHSP 116 act as a standby for the other three NHSPs 107, 108, and 115.

There are many different causes of unavailability, and hence many different issues to be addressed in order to ensure high availability. Such issues include: (1) minimizing or eliminating planned outages for hardware replacement, software upgrades, or off-line diagnostics; (2) minimizing single points of failure so that a failure of one component does not take others out of service; (3) ensuring a prompt (preferably, sub-second) fault detection so that a system can respond quickly and before an initial failure causes secondary failures; (4) ensuring a prompt (preferably, sub-second) and accurate fault isolation so that the true source of the problem can be identified and the failing component can be quickly replaced; (5) ensuring prompt (two seconds or less, for example) restart or fail-over to a "hot standby" with minimal disruptions of services. The present invention can be used to address all five issues.

Figure 2:
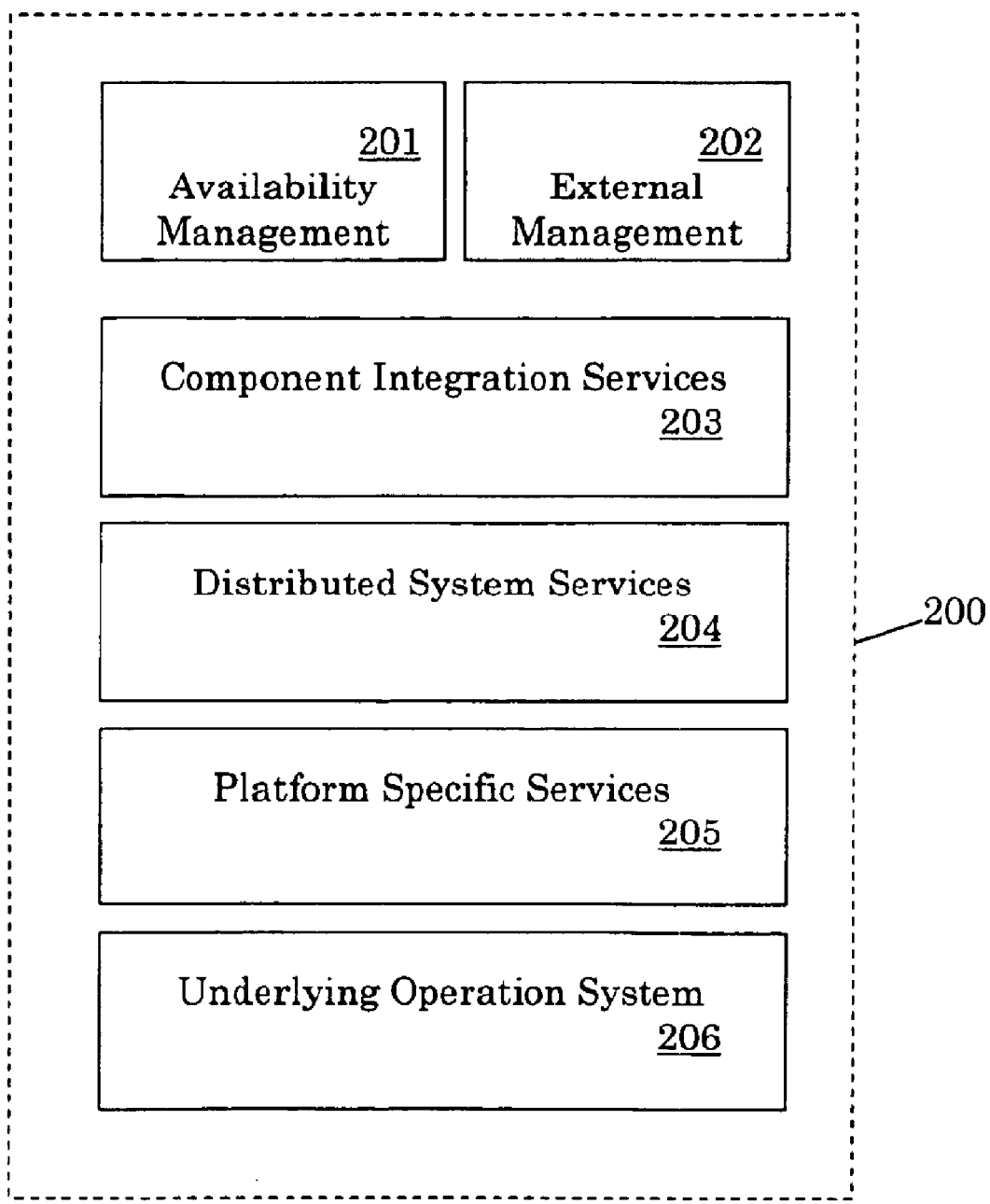
FIG. 2 is a simplified representational diagram of a software architecture of one preferred embodiment of the present invention.

FIG. 2 is a simplified representational diagram of architecture of software that may be used in one preferred embodiment of the present invention. Specifically, software architecture of the present invention may be viewed in terms of six general areas: availability management 201, external management, 202, component integration services 203, distributed system services 204, platform specific services 205, and underlying operating system 206.

The component integration services 203 include standard management and service methods that may be provided by plug-in components (e.g., device drivers, protocols, applications, etc.) to facilitate the addition of new components to a system. The availability management services 201 may manage active-standby relationships, coordinate switch-overs between active and standby components, and monitor the health of the overall system and all of its component parts.

The external management services 202 may provide an integrated framework and unified management interface for all of the components that comprise a highly available cluster or networked computer system (an "HA platform" or an "HA system"). It may be constructed to allow an easy integration of the present invention into a wide range of different network management mechanisms, including Simple Network Management Protocol ("SNMP"), Common Management Information Protocol ("CMIP"), Common Object Request Broker Architecture ("CORBA"), Java Management Extensions ("JMX"), etc.

The distributed system services 204 may be used to enable applications to be spread throughout a networked computer system or a cluster of computers. It may also be used to exchange services without regard for their physical location, network topology, or isolated link failures.

The present invention may provide platform specific services ("PSS") 205. The PSS 205 may include a set of extensions to the underlying operating system platform that provides a foundation for more generic functionality of distributed system services, component services, availability management services, and external management services. Such extensions may be platform-dependent.

The present invention operates on and with the underlying operating system ("OS") 206. The present invention may be used with a wide range of operating systems to provide a hardened, hot-swap-aware operating system that offers a rich set of standard application programming interfaces ("APIs") and a firm foundation upon which HA services of the present invention can be implemented.

Moreover, the present invention may include tools, documentation, and sample code to aid device drivers and application developers in creating hardened device drivers and high-availability-aware ("HA-aware") applications.

As described in detail below, the present invention features component architecture—in other words, it uses components to represent hardware and software in an HA system. A "component" may be defined as a collection of functionality that can be brought in and out of service, and managed as a unit. A component may be a combination of hardware and software. It may serve as a unit of redundancy.

Components are HA-aware, if they are aware of their execution in a highly available environment. In other words, they are capable of cooperating and complying with the highly available environment. They may also facilitate the environment to achieve high availability more efficiently and effectively.

The present invention represents an HA system as being comprised of a collection of components that can be independently delivered, replaced, and managed. The present invention makes it possible to shutdown, replace, and restart a component with little or no impact on other components.

Components are managed so that they jointly provide a service whose availability is much greater than the availability of any individual component. Such system might act as a single highly available network element.

An HA system of the present invention may be comprised of many independent "managed components." Such components may include: (1) hardware "field replaceable units" ("FRUs"), which can be powered on and off, removed, or replaced without affecting the operation of other hardware components and (2) independent software functions ("logical FRUs"), which can be shut-down, restarted, or upgraded without affecting other software in the system. Components may be "CPU nodes," each of which is running an instance of an operating system. Using "CPU nodes," the present invention enables individual nodes to be rebooted with little or no effect on other nodes. Further, hardware components may be distributed across multiple independent shelves and buses so the failure of a single fan, power-supply, CPU, or even a backplane does not take out the entire cluster or networked computer system.

Figure 3:
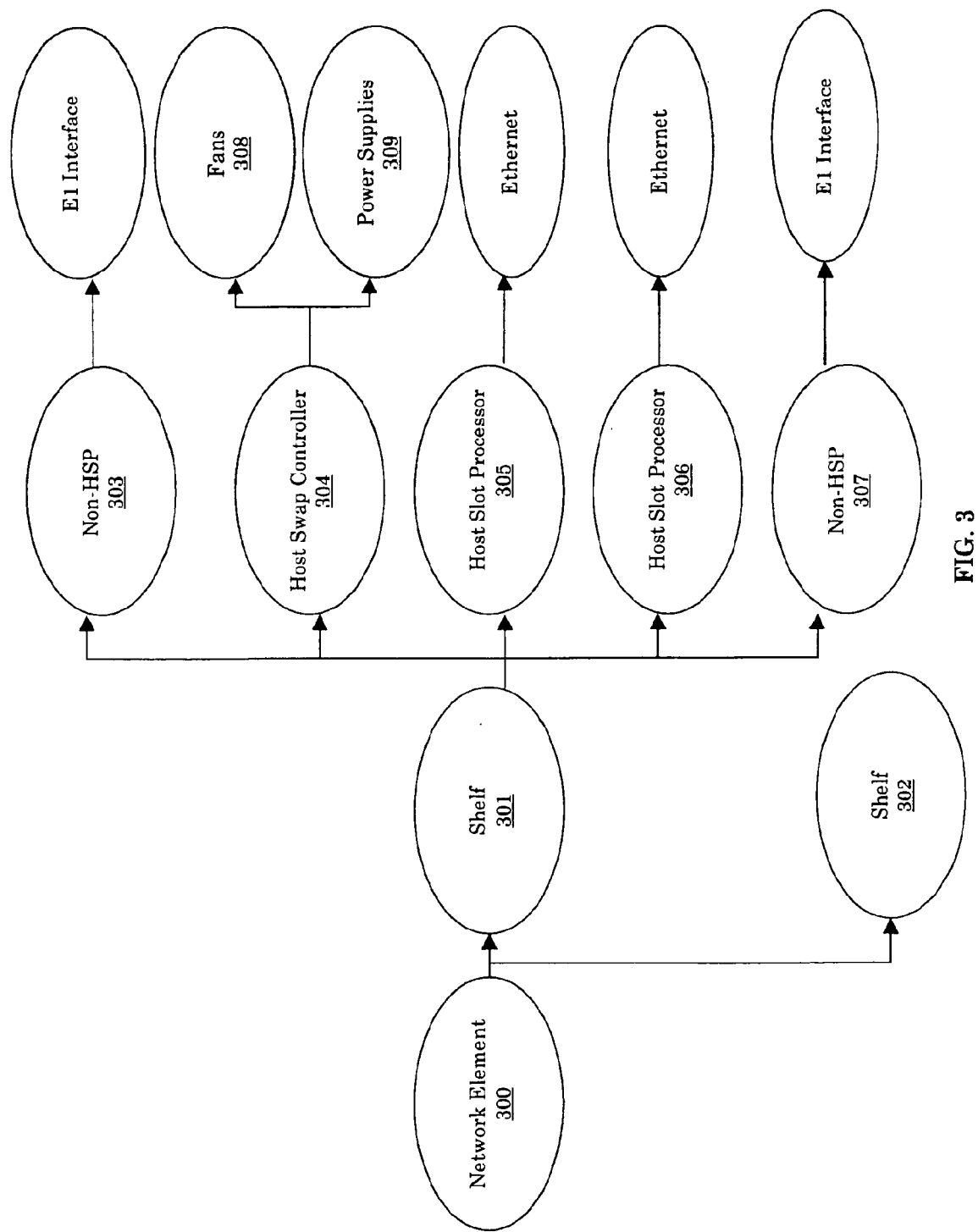
FIG. 3 is a tree diagram depicting an exemplary physical component hierarchy among hardware components in a networked computer system.

Components can exist in multiple hierarchical relationships. Such relationships may show physical or non-physical containment. FIG. 3 is a tree diagram depicting an exemplary physical component hierarchy (or physical containment relationships) among hardware components in a networked computer system. A network element 300 includes shelves 301 and 302. The shelf 301 further includes NHSPs 303 and 307, HSPs 305 and 306, and a HSC 304. The components that comprise the shelf 301 may themselves contain additional components. For example, the HSC 304 includes fans 308 and power supplies 309.

Figure 4:
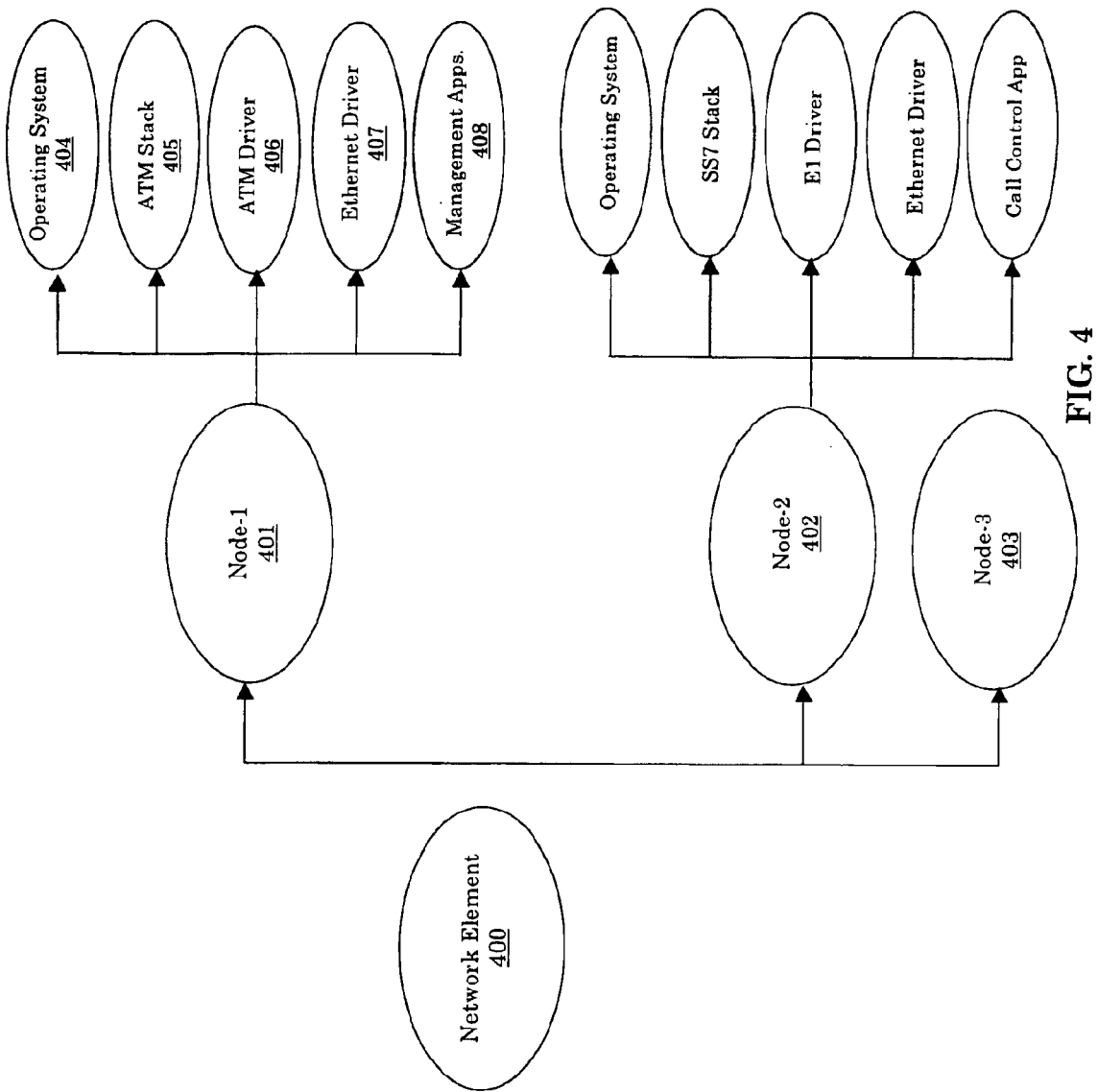
FIG. 4 is a tree diagram depicting an exemplary software component hierarchy among software components in a networked computer system.

FIG. 4 is a tree diagram illustrating exemplary non-physical containment relationships or software component hierarchy among software components in a networked computer system. A network element 400 includes a node-1 401, node-2 402, and node-3 403. Each node may contain additional components. For example, the node-1 401 includes an operating system 404, Asynchronous Transfer Mode ("ATM") stack 405, ATM driver 406, ethernet driver 407, and management applications 408.

It is important to note that the diagrams of FIGS. 3 and 4 are merely examples. The present invention may be used in a wide variety of networked computer systems with a wide variety of physical and non-physical containment relationships.

Relationships may be more abstract in nature. For example, a "sector" component might be comprised of several CPUs, protocol stacks, and communications interfaces. Some relationships may limit the independence of components. For example, powering off a shelf affects all of the components in that shelf.

Components can also be divided into classes and sub-classes. Classes may include shelves, system nodes, devices, and applications. Sub-classes may include ethernet interfaces, ATM interfaces, and E1 interfaces, for example. For each standard class and sub-class, there may be an interface specification that describes standard properties and methods that components of that class may be required to support. Such methods may include HA management-related methods, such as reset, self-test, and lock. They may also include client methods for services provided to other applications. Further, the class specifications and their templates may be used to provide a framework for implementing new components. They may also enable new component implementations to interoperate with existing applications and management agents.

Components may be viewed as a fundamental unit of encapsulation, deployment, and manageability. When new applications and devices are added to a networked computer system, they are typically added as new components.

To prevent service outages during normal operation, components may accept dynamic changes in their configuration. It is common for the configuration of network-based applications to change during normal operation. To prevent frequent outages due to these configuration changes, components may be held responsible for recognizing that their configuration has changed and taking this change into account by operating based on the new configuration.

Figure 6:
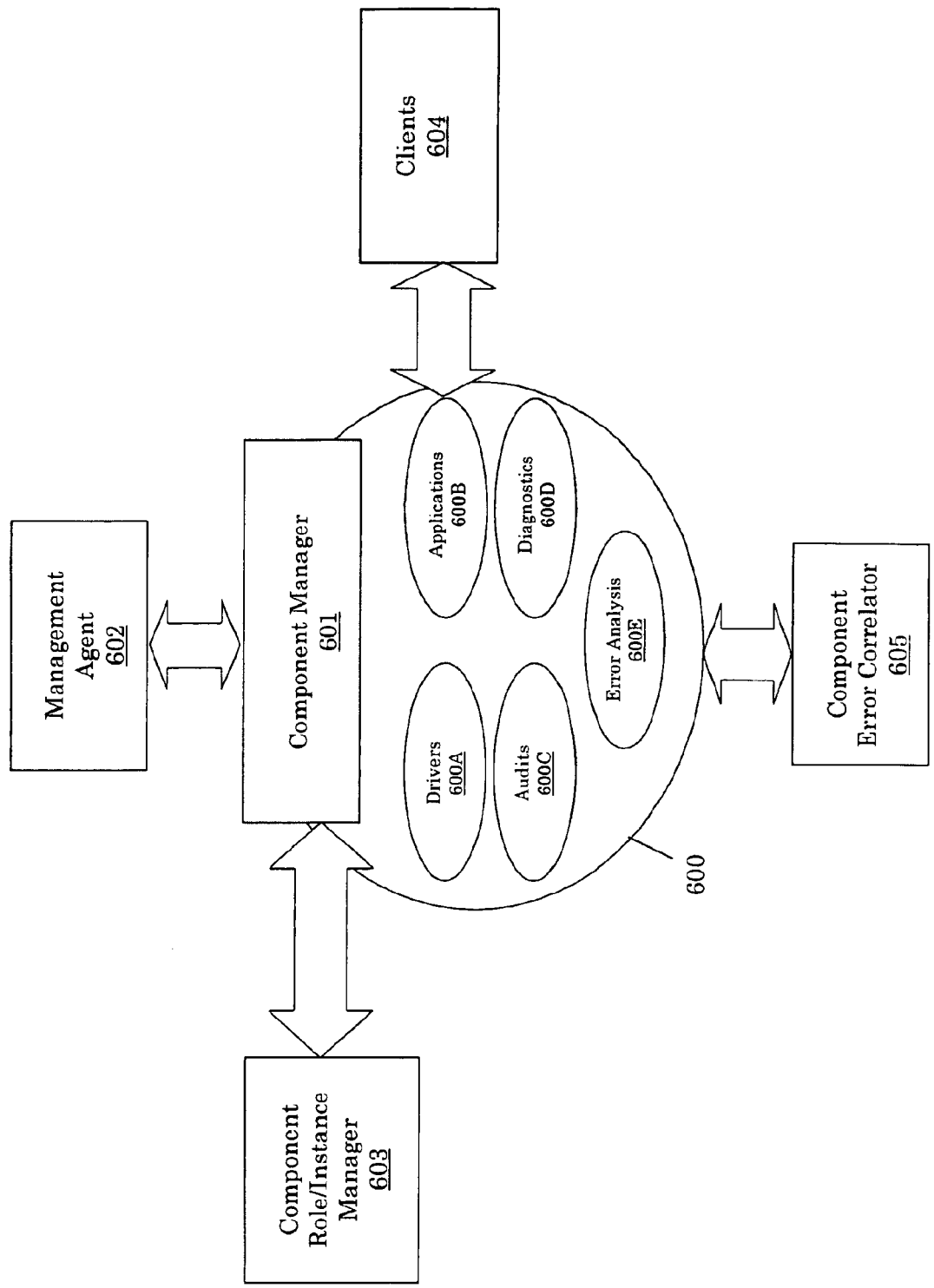
FIG. 6 is a representational diagram of an exemplary component that may be used in a preferred embodiment of the present invention.

As shown in FIG. 6, a component 601 might contain physical devices and their drivers 600A, applications 600B, diagnostic applications 600D, applications for conducting audits 600C, and error analysis applications 600E.

By providing standard class-interfaces through which components interact with management agents and other applications, components may allow developers greater freedom in structuring and implementing components. In FIG. 6, a component manager 601 may function as an interface to a management agent 602 and a component role and instance manager ("CRIM") 603. The component 600 may also interface with a component error correlator ("CEC") 605 and clients 604.

If newly-supplied components fully support all of the interfaces associated with their class and/or sub-class, they would automatically be manageable within various management contexts.

To allow management frameworks to remain unaware of inner workings of components that they manage, each component may need to assume a significant responsibility for its own management. Specifically, a component may be held responsible for starting up and shutting down its constituent parts. It may also be held responsible for detecting its own failures, containing them, and if possible repairing them. It may be held responsible for isolating its own faults and reporting them to an availability external management and/or reporting sub-system. In addition, it may be held responsible for running diagnostics on itself to determine whether or not it is suitable for service or doing operations required to implement standard management commands within various management contexts. Another responsibility for a component may include configuring itself based on persistently stored information, such as information stored in a cluster configuration repository, for example.

Components described above may facilitate an integration of third party applications, drivers, and hardware into an HA system of the present invention. They may also facilitate a modular architecture comprised of reusable components that can be deployed in a wide range of configurations.

An HA cluster of the present invention may include one or more individual nodes, which are interconnected to each other. Nodes may be peer nodes or non-peer nodes. Peer nodes are nodes that are part of a cluster and typically participate in distributed system services, which are described in detail below. As such, peer nodes can be integrated in to an HA cluster of the present invention. Non-peer nodes are those that do not fully implement all of the cluster and distributed system service protocols. Nodes may also be components, and thus may be managed through a standard set of management methods and configuration parameters for components.

Nodes may cooperate to jointly provide highly available services. For example, among peer nodes, if one of them fails and has to be serviced, another peer node may be capable of assuming its work. This would enable the HA cluster to which peer nodes belong, to continue providing services provided by the failing node through a peer node that has replaced the failed node.

A proxy component manager may be used to integrate non-peer nodes or services provided by non-peer nodes into an HA cluster and its external management services. The proxy component manager may run on a peer node and act as a gateway between an HA cluster and non-peer nodes and services provided by non-peer nodes. Specifically, the proxy management service creates a proxy or proxies for a non-peer node. Proxies may (1) communicate with non-peer nodes through appropriate devices and/or network protocols; (2) get configuration information from the repository of the HA cluster and forward it to the non-peer nodes; (3) register with the availability management services of the HA cluster and implement standard availability management operations in terms of commands to the non-peer nodes; (4) plug into external management services and implement standard management operations in terms of commands to the non-peer nodes; and (5) relay information, such as statistics and alarms, from the non-peer node to the management services. Proxies may perform some or all of the five operations. They may perform other operations to further manage entities being proxied by components.

The use of proxies may not be necessary for those non-peer nodes that are connected via a standard interface and communicate over a standard protocol, since clients can communicate directly with software on such non-peer nodes. Examples of a standard interface include ethernet, ATM, cPCI backplane. A standard protocol may be IP, for example.

Figure 8:
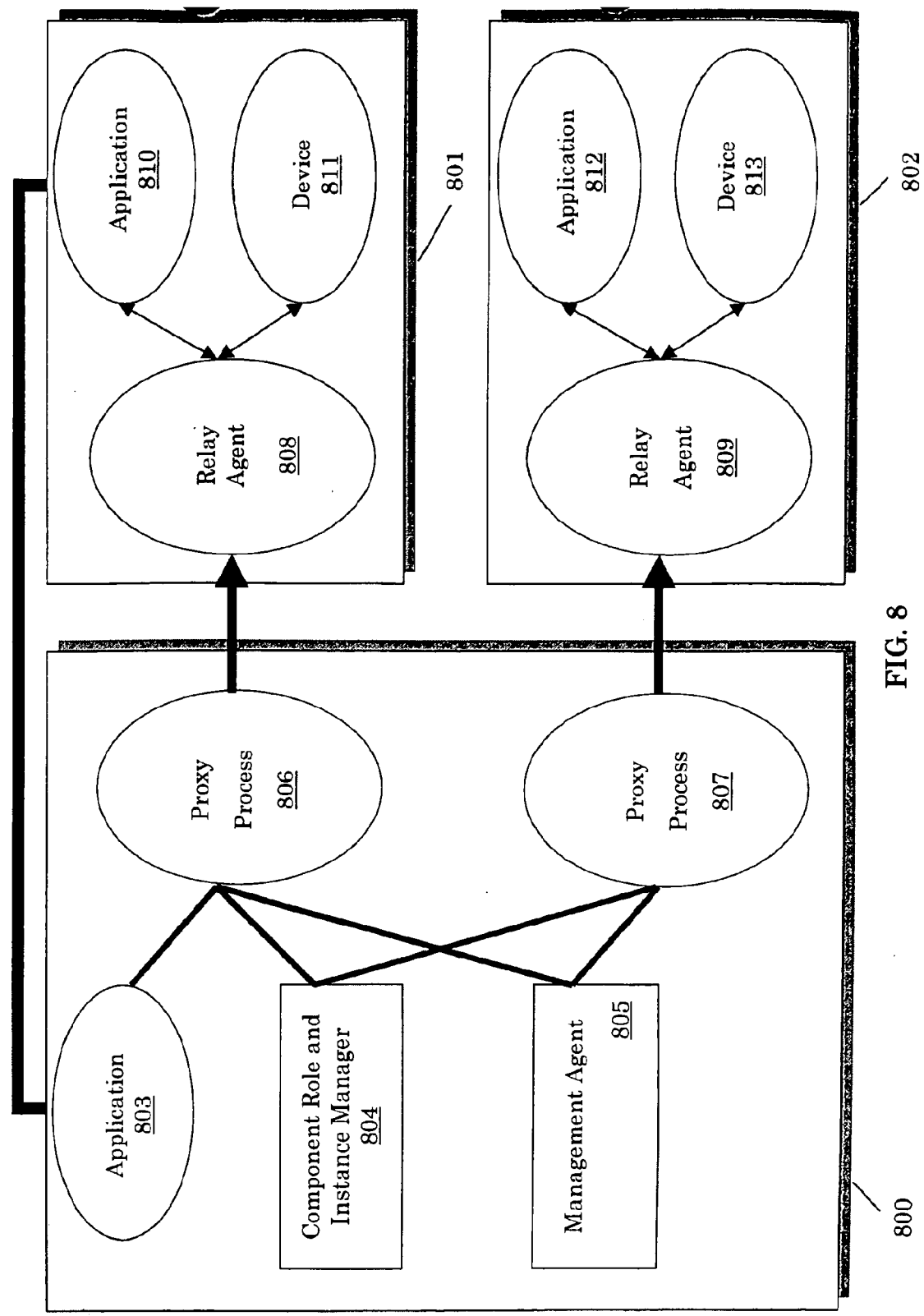
FIG. 8 is a representational diagram showing one use of proxies to represent non-peer nodes in a networked computer system of the present invention.

FIG. 8 is a representational diagram illustrating one exemplary use of proxies. A payload card 801 is a non-peer node and has a relay agent 808, application 810 and device 811. Similarly, a payload card 802 is a non-peer node and has a relay agent 809, application 812, and device 813. An HA cluster 800 contains proxy processes 806 and 807 functioning as proxies for the relay agents 808 and 809, respectively. In other words, the payload cards 801 and 802 are entities being proxied by the proxy processes 806 and 807, or proxied components. Through the proxy processes 806 and 807, an application 803, CRIM 804, and management agent 805 may interface with the relay agents 808 and 809 of the payload cards 801 and 802.

It is preferable to interconnect peer nodes within a cluster using multiple redundant links, so that a failure of a single interconnect does not isolate the node that is connected to the cluster via the failing interconnect from its peer nodes, and hence from the cluster.

Each node may contain a "cluster membership monitor" ("CMM"), which is used to maintain contacts with other cluster members. The CMM can also elect one node to be the "cluster master." The cluster master typically detects new nodes and admits them to the cluster, and uses heartbeats to detect failures of existing cluster members. It may also act as a central coordination point for cluster-wide synchronization operations.

Applications running on peer nodes may interact through location-independent distributed system services. Such distributed system services may be used to hide the underlying fabric and topology of the cluster. They may also be used to facilitate a migration of applications from a failing node to a healthy one. Distributed system services are described in more detail below.

An availability management framework assigns available components to act as standbys for active components, and introduces the active and standby components to one another. The active component may then use message based checkpoints or the cluster distributed checkpoint service to keep the standby component up-to-date. When an active component fails, the availability management framework automatically instructs the standby component to take over.

In one preferred embodiment of the present invention, components are managed so that a system to which they belong is made highly available. The present invention may serve a variety of management services, including availability management services. The availability management services are typically responsible for choreographing the assignment of available components to active and/or standby roles, and for promptly initiating recovery actions in response to failure reports. They may be designed to permit HA aware applications to participate in the availability management process, while managing details of configuration and policy for the cluster. They allow a cluster to provide various redundancy models (e.g., hot-start, 2N, N+1, load sharing, etc.), while allowing individual components to remain unaware of a specific redundancy model being employed, or the sensing and management networks and policies that control their use.

Availability management services may be capable of: (1) assigning applications to needed service instances based on a system configuration and available components without forcing applications to be aware of the system configuration; (2) assigning applications to active and standby roles according to a wide range of redundancy models, and without forcing the applications to be aware of configured recovery policies of the system; (3) facilitating the exchange of checkpoints between active processes and their standbys without constraining what checkpointing mechanisms and policies the applications can use; (4) assisting applications in the monitoring of their own health without constraining the methods that they use to ascertain their health; (5) enabling applications to advise the availability management system about their own health, without forcing the applications to be aware of fail-over policies; and (6) gathering information about component health from a range of direct and indirect sources.

The availability management services may include a CRIM, whose task is to implement availability management policies. It may also include a fault-detection model involving both in-line error detection and external audits and an error correlation model for isolating errors that can only be inferred by correlating multiple reports.

Figure 7:
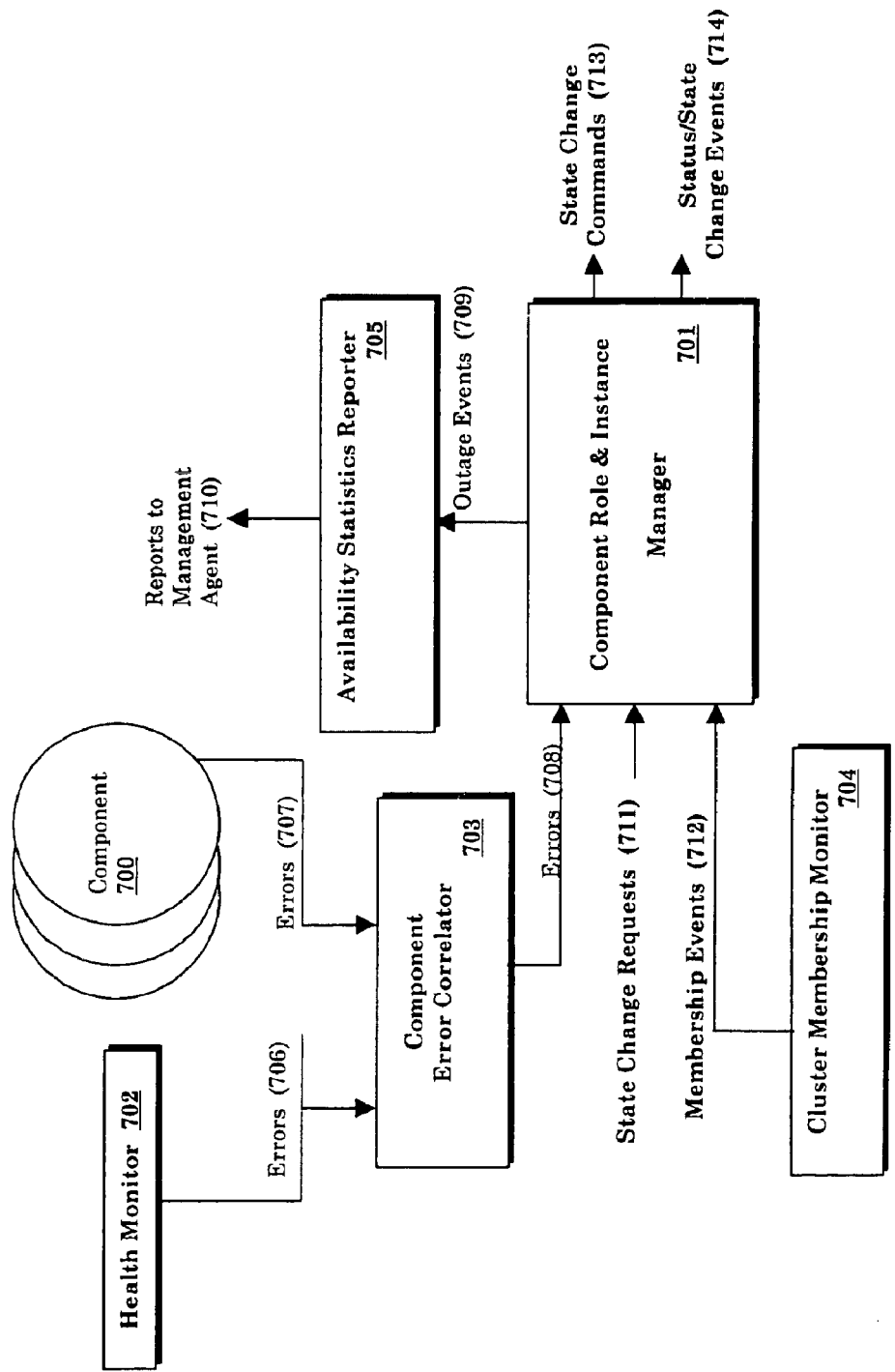
FIG. 7 is a logical view of availability management services of one preferred embodiment of the present invention.

FIG. 7 is a logical view of availability management services that may be provided in one preferred embodiment of the present invention. In this embodiment, availability management services may be provided via a health monitor 702, component error correlator ("CEC") 703, CMM 704, CRIM 701, and availability statistics reporter 705. The health monitor 702 and components 700 report errors 706 and 707 to the CEC 703, which in turn reports errors 708 to the CRIM 701. The CRIM 701 also receives state change requests 711 and membership events 712 from the CMM 704. The CRIM 701 reports outage events 709 to the availability statistics reporter 705, which in turn reports to a management agent 710. The CRIM 701 also issues state change commands 713 and handles status/state change events 714. The health monitor 702, CEC 703, CMM 704, CRIM 701, and availability statistics reporter 705 are further explained in detail below.

The availability management services may assign states to components and manage them. Using states, the availability management services enable a single component implementation to be used in a wide range of products with varying redundancy requirements. When the availability management services bring components in and out of service, their states are updated appropriately. The CRIM 701 may be held responsible for managing states of components.

Figure 5:
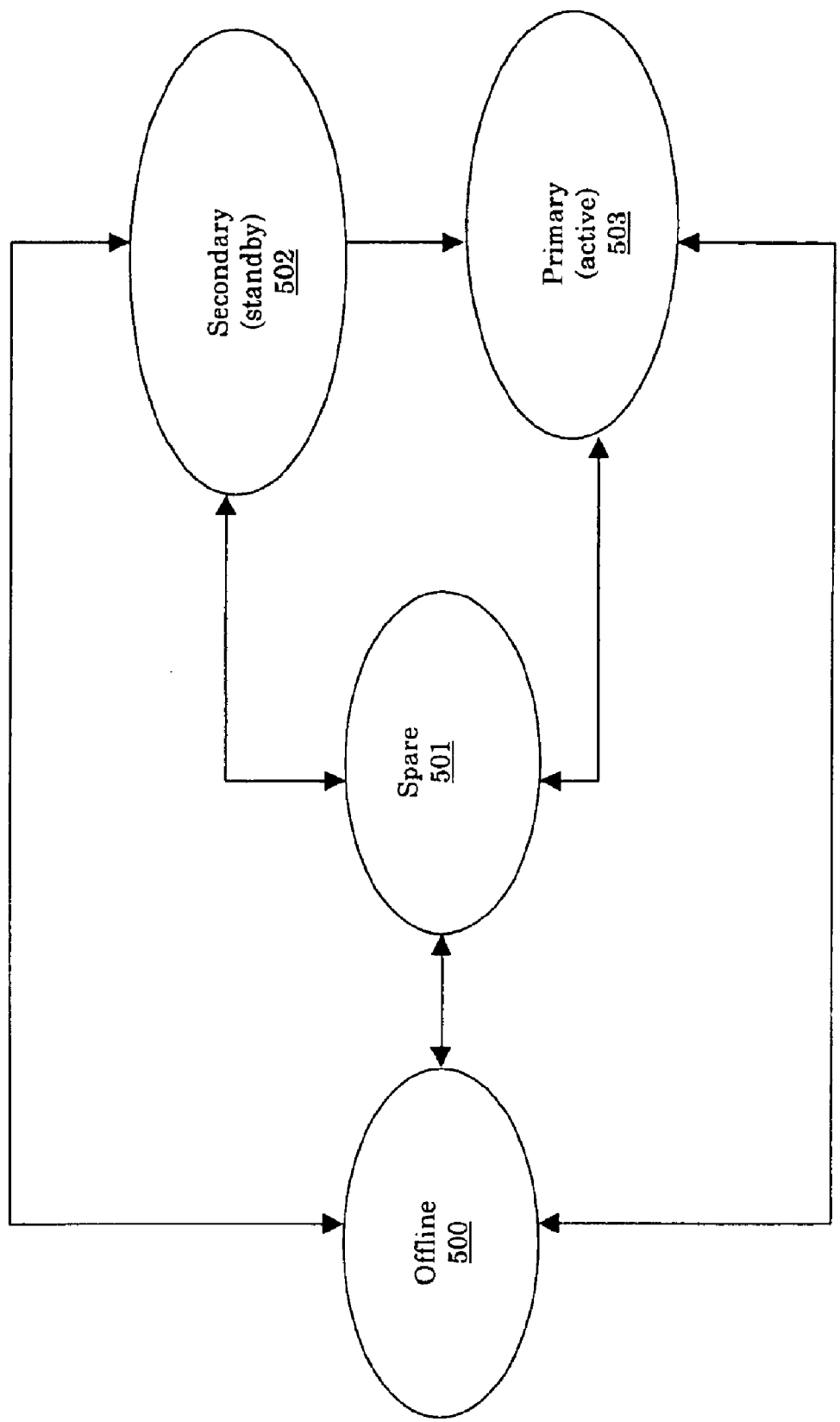
FIG. 5 is a representational diagram representing relationships among different states that may be assigned to components of the present invention.

FIG. 5 is a representational diagram showing relationships among component states in one embodiment of the present invention. According to this embodiment, component states may have four state values—off-line 500, spare 501, secondary (standby) 502, and primary (active) 503. An off-line component can run diagnostics or respond to external management commands, but is not available to perform services. A spare component is not currently performing any services but is available to do so at any time. A secondary component may not actually be carrying bearer traffic, but is acting in a standby role for a primary component, and is prepared to assume an active role at any time. A primary component is in an active role and providing service in the system (e.g. carrying bearer traffic). If a secondary component has been apprenticed to it, the primary component may also be sending regular checkpoints to its secondary component.

Referring back to FIG. 5, a offline 501 component may go into a spare 501, secondary 502, or primary 503 state. A spare 501 component may go into an off-line 500, secondary 502, or primary 503 state. A secondary 502 component may go into a primary 503, spare 501, or off-line 500 state. A primary 503 component may go into a spare 501 or off-line 500 state.

Component state information may be used by the CRIM 701. The CRIM 701 may receive an input about the status of each component and direct role reassignments accordingly.

To facilitate management of components, all serviceable components may register themselves with the CRIM 701.

The CRIM 701 may then consult configuration data and decide which service instance each component needs to be assigned to, which components need to be made active, and which components need to be apprenticed to them as standbys. It may also issue appropriate commands to affected components. The CRIM 701 may be made the only process of the availability management services that can direct state changes within the availability management model and process all requests to initiate state changes.

The CRIM 701 may accept reports on the changing status of components, and readjust work assignments accordingly. Status changes may occur when: (1) a new component has become available for work; (2) a current component has experienced a loss of capacity or failure; (3) an operator requests (through external management services, for example) that a component be taken off-line; or (4) a component has asked to have itself taken off-line so that it can run diagnostics to test for a suspected intermittent problem, for example.

When a new component becomes available for work, the CRIM 701 may assign it a specific service instance and an availability management state. When a component becomes unsuitable for work or when it has issued a request to the CRIM 701 to be taken off-line, the CRIM 701 may determine an appropriate recovery action and initiate it. A recovery action may be to: (1) instruct the old unit to attempt a soft reset; (2) kill and attempt a hot restart of the failed component; or (3) instruct a standby to become primary, and take the old unit off-line.

To ensure a prompt response to a failure, the CRIM 701 may be made capable of responding to various reassignments automatically without the need for an operator intervention. However, the CRIM 701 may cooperate with another service or services in performing failure recovery operations. For example, if the CRIM 701 determines (based on available components, for example) what recovery action to take, but if the recovery action involves a function not provided by the CRIM 701, the CRIM 701 may ask another service to actually perform the required operations.

In addition to reassigning work in response to component status changes, the CRIM 701 may also publish events so that other interested applications and management agents can learn of status changes and reassignments of components they depend on.

The CRIM 701 may also be a highly available service. In other words, there may be standby CRIMs running on other nodes. If an active CRIM fails, a designated standby may promptly take over. By making the CRIM 701 highly available, a failure of an active CRIM would have little or no effect on the components being managed.

The present invention may also be capable of promptly and accurately isolating failures to a responsible component. In general, it is preferable to detect, report, and contain errors as close to the source as possible. A delay in an error detection not only delays an initiation of a recovery procedure but also may result in propagation of the error downstream, causing additional damage. Further, such secondary effects may obscure the original cause, making it more difficult to isolate the failure to the correct component.

To achieve a prompt and accurate error detection, it is desirable to allocate a responsibility of detecting errors to individual components. Errors may be detected by other applications or services—for example, a client through an inappropriate or inconsistent response or the operating system based on an exception, an erroneous request, or excessive resource consumption. However, these are all indirect, delayed, and/or imprecise symptoms of a condition that could have been more promptly recognized, more accurately characterized, and more gracefully responded to by in-line error checks and periodic audits within the failing application. In other words, by holding individual components responsible for detecting their own errors, one would facilitate high availability.

Yet, there are situations where an error cannot be isolated to a particular component promptly or leads to secondary failures. To efficiently handle such situations, the present invention may use the CEC 703. The CEC 703 may be made capable of interposing an error correlation engine between the error detection/reporting software and the CRIM 701.

One may choose to use a single CEC for the entire cluster. When using a single CEC, error logging APIs route all error reports through the CEC. Upon receiving an error report, the CEC 703 may be programmed to: (1) forward the report directly to the CRIM 701; (2) forward the report to the CRIM 701 after modifying the indicated component based, for example, on additional information that the CEC 703 has gained from other reports; (3) forward the report to the CRIM 701 after modifying the suggested recovery action after having determined that a more radical recovery action may be required, for example; (4) simply note the report and continue to look for additional reports to infer the true cause of the problem; or (5) discard the report entirely after determining that it is stale or redundant. The CEC 703 may be programmed to provide additional services.

An ability to determine whether a report is stale or redundant is useful in dealing with the following two situations. First, it would allow the system to filter out redundant secondary reports so that the system can focus on the primary problems that have caused secondary failures (and thus secondary reports). In so doing, the system can avoid wasting valuable time and resources to process secondary reports and focus on the real cause of the problem instead. Second, it would also allow the system to discard stale reports, preventing premature escalations and unnecessary recovery actions. Error reports may continue to be generated for some time after recovery has been initiated. If the system does not recognize that these reports are "stale," a service outage may be unnecessarily prolonged by premature escalation to more radical recovery actions, when the more prudent action would have been to give the current recovery action a chance to work before declaring it to be a failure.

The CEC 703 may be a stateful application, thus remembering recent history. Further, the CEC 703 itself may be made highly available—if a primary CEC fails, a standby CEC may take over its role.

The availability management services may include a health-monitoring framework, which monitors health of components and other applications and hardware used in a networked computer system. A health-monitoring framework may be used to detect various types of errors that are difficult to detect with in-line code, including: (1) no-response situations, where an awaited event never happens; (2) leaks and inconsistencies in resource pools; (3) latent failures in idle components; and (4) silent failures in other services.

A health-monitoring framework may allow components on each node to register audit functions. A health monitor may automatically perform the registered audit functions. Some audits may be associated with system functions (e.g., distributed system services), while others are associated with customer supplied application services (e.g. call control applications).

If an audit function of a health monitor detects an error, it may generate an error report. If an audit function fails to complete within a specified time, the health monitor may automatically report a failure of the associated component.

The health monitor may also be made responsible for servicing various applications and hardware used in the present invention, including a hardware watchdog timer. If the health monitor becomes non-responsive, because of an error in the health monitor or a problem in the underlying operating system, for example, the watchdog timer may be used to automatically reboot the entire node.

Availability management services of the present invention may also include a framework to detect failures of an entire node. Such framework may be called a cluster membership monitor ("CMM") 704. As discussed above, components and/or a health monitor may report errors that are detected on a particular node. However, in providing a highly available system, one needs to be able to detect failures of an entire node, since such failures would prevent a local health monitor from reporting anything. In a preferred embodiment, availability management services provide this function using the CMM 704.

Each node in a cluster may have a CMM running on it. When a cluster is first started, the CMMs may elect one node to be the cluster master. The CMM on the cluster master node (or "master node") may be made responsible for admitting new nodes to the cluster. The master node may exchange heartbeats with the other nodes in the cluster to detect failures of those nodes. If a standby node detects that the current cluster master has failed through heartbeat failure, for example, the standby node may immediately assume the role of the cluster master.

The CRIM 701 may receive error reports from various sources, including the CEC 703 and the CMM 704. When a node becomes non-responsive, the CMM 704 may report this error to the CRIM 701. A node may become non-responsive, when a watchdog timer reboots it, for example. The CRIM 701 may take this as an indication that all components running on that node have failed, and reassign work accordingly.

In an HA platform, errors may be detected through a variety of sources, including error detection code, the health monitor ("HM") 702, the CEC 703, the CMM 704, and the CRIM 701. They may work together to enable an HA platform to automatically detect and recover from a wide range of failures.

In addition to automatic failure detection and recovery, an HA platform may need to perform additional availability management functions. For example, when a component fails, a report may need to be generated to an external operation management center. Such a report may include a characterization and quantification of any service loss that accompanied the failure. In one preferred embodiment, the availability management services provide such functions using the availability statistics reporter ("ASR") 705.

The ASR 705 may be held responsible for analyzing incidents based on reports from the CRIM 701, generating appropriate reports, and forwarding them, through the management services, for example, to an external management facility. The ASR 705 preferably has sufficient information for generating appropriate reports. Such information may include an understanding of the roles and capacities of all components in the system.

Upon receiving a report about a status change in a component, the CRIM 701 may forward it to the ASR 705. Further, the CRIM 701 may issue additional notifications to the ASR 705—for example, if a recovery action is appropriate, the CRIM 701 may issue notifications when the recovery action is initiated, and when the recovery action has been completed and the service has been restored.

In a preferred embodiment of the present invention, distributed system services ("DSS") may be used—the DSS may include a collection of location-independent mechanisms that enable applications to interact with one another. The DSS may enable applications to interact with one another without knowing where they are running, or where the other applications with which they are communicating are running. Using the DSS, all applications may see the same messaging, event, and configuration services, independently of which node they happen to be running on. In other words, the DSS may allow applications to communicate regardless of their relative locations.

Application services may also interact with their clients through the DSS, allowing them to migrate from one node to another without affecting their clients. The DSS may also facilitate load-sharing and system expansion by allowing work to be distributed among multiple processor nodes.

Figure 9:
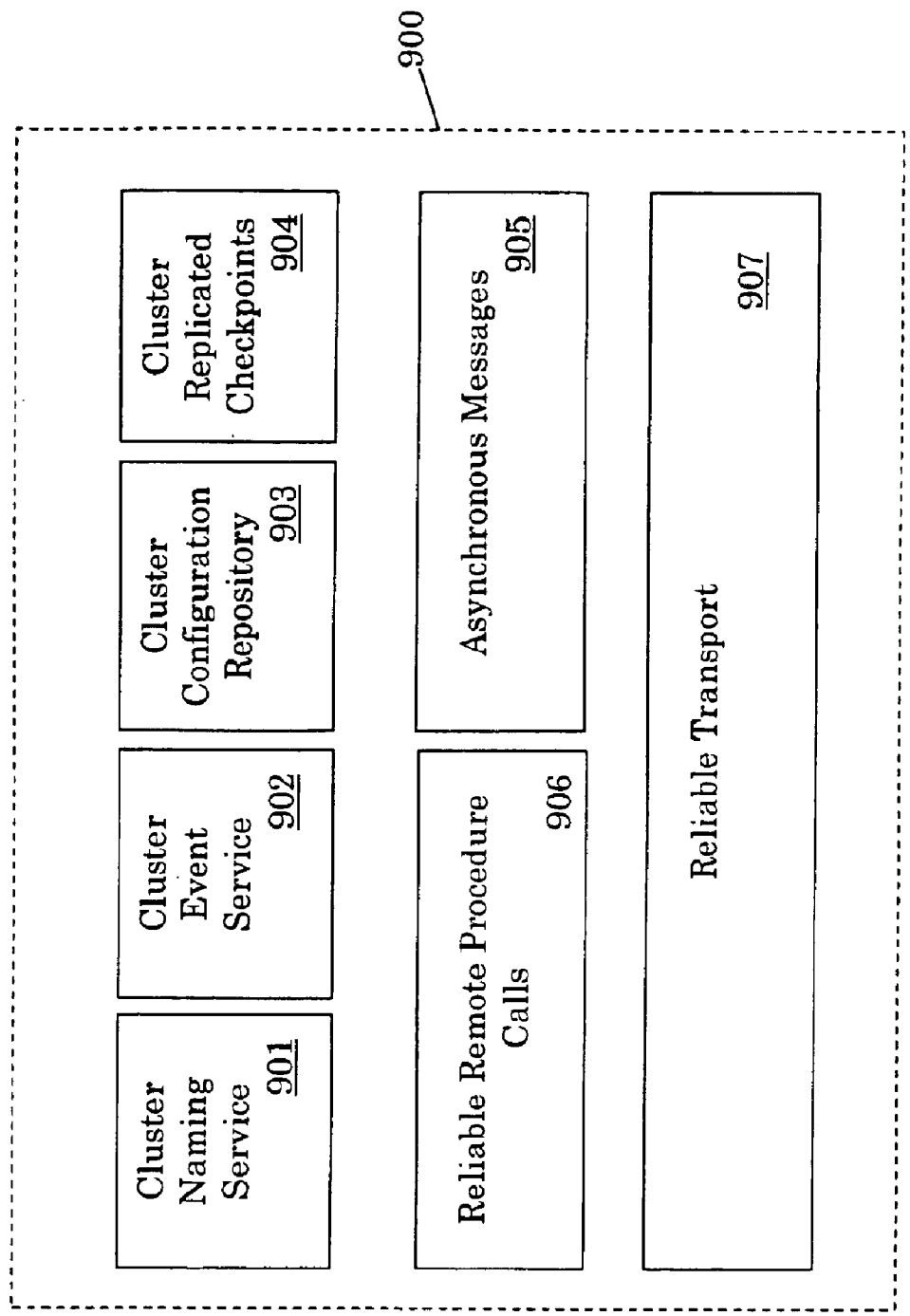
FIG. 9 is a representational diagram of one embodiment of distributed system services of the present invention.

FIG. 9 is a representational diagram of one preferred embodiment of DSS. In FIG. 9, a DSS 900 provides at least seven types of services and/or mechanisms—a cluster naming service ("CNS") 901, cluster event service ("CES") 902, cluster configuration repository ("CCR") 903, cluster replicated checkpoints ("CRC") 904, reliable remote procedure calls ("RRPC") 906, asynchronous messages ("AM") 905, and reliable transport 907.

The RRPC 906 may provide a mechanism for basic intra-cluster or intra-system communications. Using this mechanism, for example, a client may issue a request to any server in the system without regard to their respective locations and await a response. The RRPC 906 may be suitable for services that require positive acknowledgments for robustness, require distinct requests to be serialized, or offer an automatic retry in case of a server failure.

The AM 905 may also provide a mechanism for basic intra-cluster or intra-system communications. The AM 905 may require responses and may be suited for services that require minimum latency and overhead, do not require explicit acknowledgment or serialization, or can operate properly despite occasional silent failures.

The RRPC 906 and AM 905 may also send calls and/or messages from exactly one sender to exactly one receiver over a pre-arranged point-to-point communication channel.

The CNS 901 may be used to provide a cluster-wide, highly available naming service. Servers may register communication handles (and other things) under well-known names in a hierarchically structured name space provided by the CNS 901. Clients may look up the names for services they want, and obtain communication handles (or other objects to support the exchange of services). Handles for both the RRPC 906 and AM 905 may also be registered and obtained from the CNS 901.

The CES 902 may automatically distribute events from a publisher to all processes in a cluster that have subscribed to that type of the event. Using the CES 902, a publisher may not need to establish an explicit channel with all possible subscribers. Similarly, subscribers may not need to establish an explicit channel with a publisher.

The CES 902 may be used in various situations. The CES 902 may permit interested processes to obtain information about service-relevant occurrences like errors, new devices coming on-line, and service fail-overs. It may also be used by arbitrary applications to asynchronously share or distribute arbitrary pieces of information asynchronously. For example, distributed applications that implement a new cluster-wide service may publish events to announce when new nodes join the cluster and trigger an automatic resynchronization process to bring an application instance running on the new node up-to-date.

The CCR 903 may be used to provide information regarding services to be provided by components. Typically, any component, running on any node, can be told by the CRIM to begin providing any instance of its service. This means that the configuration information associated with all instances of all services may need to be available on all nodes at all times. The CCR 903 may be used to provide such information using, for example, using a fast and light-weight, extensible, highly available, distributed, persistent database that permits arbitrary values, structures and tables to be retrieved from a hierarchically structured name space. Applications may use repository APIs to access the CCR 903—they may get and set the values of parameters and obtain notifications when a particular parameter is changed.

Many external management and configuration operations may be implemented by merely updating information in the CCR 903. Associated applications can register an interest in a part of the CCR 903, so that they may be automatically notified when any relevant parameters are changed. Once applications receive a notification of any changes, they may then re-read their configuration information in the CCR 903 and promptly give effect to the new parameters.

The CCR 903 may also be used by applications as a highly available, distributed, persistent storage facility for slow-changing application and/or device state information. For example, applications may store calibration data, software version information, health history, and/or administrative state in the CCR 903.

The CRC 904 may provide a mechanism that would allow active components to pass information regarding its state to standby components. As discussed above, the HM, CEC, and CRIM typically perform most of the work associated with isolating an error and orchestrating a recovery. For example, they might work together to detect a failing primary component and tell the failing primary component to restart. Alternatively, they might tell a secondary component to take over the role of the failing primary component. In the latter case, it is desirable for the successor to be able to pick up where the failing component left off. In other words, it is desirable for the standby component to know what the last stable state of the active component's service was. Using the CRC 904, an active component may pass its state to a standby component through a series of checkpoints.

There are many ways to take checkpoints. Decisions about how often checkpoints should be taken and how much information should be included in each checkpoint are typically highly application-specific. In deciding how to take checkpoints, one may keep in mind that the frequency of data exchange may affect performance as well as effectiveness of failure recovery. Specifically, if data is exchanged too often, then performance would suffer. However, if data is exchanged too infrequently, some work may be lost in case of a failure.

There are other factors that one might consider in devising a checkpointing strategy. While incremental checkpoints may be more efficient than complete checkpoints, it may be preferable to have an additional mechanism to bring new standbys up to speed. For instance, exchanging highly abstracted transactions typically requires more computation, but exchanging detailed micro-state may be more likely to re-trigger the same failure in a standby that resumes that state.

The CRC 904 may be designed so that it is independent of checkpoint mechanisms. That is, the CRC 904 may not require applications to use any particular checkpoint mechanism. As such, the CRIM may simply arrange a rendezvous between primary and secondary components without specifying how to exchange states.

The CRC 904 may provide two mechanisms—a message-based mechanism and a cluster-replicated checkpoint service. A message-based mechanism may be used for small and sparse updates to a hot standby. A cluster replicated checkpoint service may be used for N+1 redundancy and hot-restart models. Both mechanisms may include synchronous and asynchronous versions. Further, they may work on a single node or across multiple nodes, independently of topology and interconnects, and make no assumptions about which or how many secondary components are associated with which primary components.

To accommodate developers who want to use other checkpointing strategies, the present invention may also feature a general rendezvous between an active and a new standby applications. This mechanism would enable developers to use whatever checkpoint arrangements they want.

The DSS 900 may be implemented on top of reliable transport mechanisms 907. The reliable transport mechanisms 907 may automatically route traffic over a variety of links and exploit redundant paths to circumvent failures in individual interconnects and communications interfaces. It may also receive notifications, from a CMM, for example, when nodes fall out of the cluster, allowing prompt notifications of failures of their outstanding requests to applications awaiting RRPC responses from a dead node.

Figure 10:
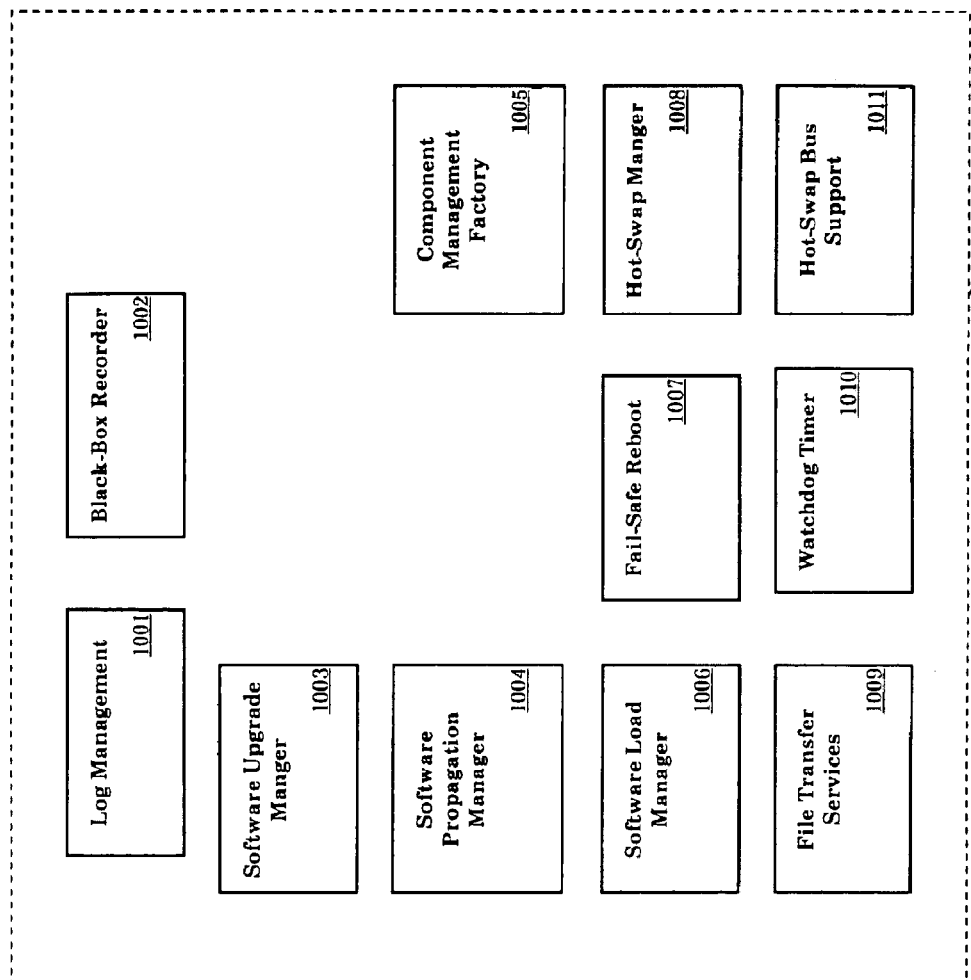
FIG. 10 is a representational diagram of one embodiment of platform specific services that may be included in the present invention.

FIG. 10 is a representational diagram showing different services that may be provided by a PSS 1000. They include a log management 1001, black-box recorder 1002, software upgrade manager 1003, software propagation manager 1004, component management factory 1005, software load manager 1006, fail-safe reboot 1007, hot swap manager 1008, file transfer services 1009, watchdog timer 1010, and hot-swap bus support 1011.

The hot-swap manager 1008 ("HSM") may provide a higher-level service that runs above hot-swap bus managers, such as cPCIs, and managers for other types of FRU interconnects, such as an application that watches for payload cards to come alive on dedicated serial links or join an ethernet. The underlying bus managers are typically responsible for detecting and identifying newly inserted FRUs. The HSM 1008 may be responsible for deciding what to do with the new device.

The HSM 1008 preferably knows about types of supported FRUs through code and/or configuration data, for example. For each supported FRU type, the HSM 1008 preferably knows which component managers are to be instantiated to make the FRU useful. Lastly, the HSM 1008 may know which components are configured and which components have been administratively disabled. In other words, it may know whether or not a component manager needs to be instantiated for a particular FRU.

The HSM 1008 may run on each node that owns a bus for hot-swap FRUs. When that node is first booted, the HSM 1008 may detect all of the devices already on the bus and start associated components. Then it may go into its main loop of waiting for new FRU discovery events from one of the hot-swap bus managers.

There are a few different ways in which a decision could be made to start up a new instance of a particular component manager. Some component managers may be automatically started up whenever a particular node starts up, or whenever its state changes from standby to active. These components are effectively always running, and may be referred to as "statically configured components." Some component managers, on the other hand, are started up when the HSM 1008 detects an associated FRU. These components may be referred to as "dynamically instantiated components." Finally, some component managers are created as a result of a specific command from the management framework. These components may be referred to as "manually instantiated components."

In all cases, once a decision is made that it is appropriate to create a new instance of a component, a request may be relayed to a component management factory ("CMF") 1005. Upon receiving the request, the CMF 1005 may actually locate, load, and start a component manager that would initialize and manage the new component instance. Requests to kill and restart a component instance may be issued to the CMF 1005.

There may be a CMF 1005 on every node in the cluster. The CMF 1005 may play a role in error reporting. In general, components or their registered audits are expected to detect and report errors occurring within the component. However, a component may not be able to detect and report its own errors, if its component manager dies, for example. Because the CMF 1005 may start component managers on the node where it resides, it may receive notifications whenever one of the component managers dies. When a component manager dies, the CMF 1005 may log an error to report a failure. While most of these errors could also be detected by an audit running under an HM, the CMF 1005 may be notified long before the next scheduled audit by the HM.

A software load manager ("SLM") 1006 might run only on a current cluster or system master. The SLM may be notified when it is determined that a particular software load needs to be available on the cluster or system. It might spring into action as a result of a change in a CCR, indicating, for example, that a new release is required, or as a result of an explicit command issued from an external management framework.

When invoked, the SLM 1006 may determine whether or not the specified software and configuration load is already available somewhere on the cluster or system. If it is not available, the SLM 1006 may contact an appropriate, configured software load server and download the indicated software and configuration load into a non-volatile storage in the cluster or system. The specified software and configuration may not be available, either because it has never been fetched, or because it has already been overwritten, for example.

Accepting a new software/configuration load may require overwriting some other load. As a safety measure, it may be preferable for each cluster to have sufficient storage to store at least two complete loads. The SLM 1006 may avoid overwriting a load on which the cluster or system is currently running.

A variety of download mechanisms may be used to obtain a specified release. Such mechanisms include FTP over an IP link back to a central code server. Other platforms may offer other mechanisms. Preferably, the SLM 1006 is not concerned with the actual format in which the software is packaged. Instead, it may be capable of recognizing presence or absence of a specific version.

A software propagation manager ("SPM") 1004 may run only on the cluster or system master. It may be invoked in response to a command from an external management framework to prepare the cluster or system for an upgrade to a new release. The SPM 1004 may be responsible for ensuring that a specified release of code and configuration data has been propagated into an alternate boot partition for every node in the cluster or system. This may serve as a prerequisite for rebooting nodes to the new release.

The SPM 1004 may not be responsible for downloading a new release from an external source. This function may be performed by the SLM 1006. On the other hand, the SPM 1004 may be responsible for propagating appropriate portions of the new release onto appropriate boot partitions. The SPM 1004 may also provide those basic protections that the SLM 1006 may provide. Such protections include requiring each boot partition or network boot to have sufficient space to store two complete boot images and not overwriting a partition containing the currently running release.

The SPM 1004 may understand a format in which software releases obtained by it are stored. Different platforms may support different software distribution formats, but where possible, it is preferable for the SPM 1004 to support both complete and incremental release distributions.

A software upgrade manager ("SUM") 1003 may also run only on the cluster master. It may orchestrate reboots and hand offs that would get the entire cluster running on a new software load. The SUM 1003 may run only in response to an explicit command from the external management framework.

The SUM 1003 may support three styles of upgrades—rolling upgrades, split-mode upgrades, and reboot upgrades. In rolling upgrades, all software is typically fully interoperable between the old and new versions, and nodes can typically be taken out of service, rebooted, and brought back into service one at a time. A rolling upgrade may be performed with a minimal loss of service and redundancy, and therefore is likely to yield the highest overall service availability among the three upgrade styles.

To ensure proper operation during rolling upgrade, HA-aware components may manage the versions of the interfaces they provide as servers and use as clients. Components may be held responsible for ensuring that they are capable of handling updates in the interfaces they use as clients and ensuring that sufficient information is provided through the interfaces they provide as servers so that components running different versions of software can interoperate with each other. Interfaces may include those between components of different types and between components of the same type and include, but are not restricted to, those through which information is exchanged using the RRPC, AM, CES, and CRC facilities.

In split-mode upgrades, a cluster may be divided into two demi-clusters—one running the previous release and the other running the next release. Split-mode upgrades may require a short period of a cluster outage. Split-mode upgrades may also result in a period with a single point of failure, increasing a risk of an outage.

The SUM 1003 may support split-mode upgrades as follows: (1) half of the components are taken out of service, and rebooted with the next release; (2) components running the next release are made secondary to primary components still running the previous release; (3) control is switched from the previous-release components to the new-release components; (4) currently idle components running the previous release may be rebooted onto the next release; and (5) all components, once running the next release, are reintegrated into a single cluster again, and full redundancy may be restored. The SUM 1003 may also support split-upgrades differently.

In reboot upgrades, the entire cluster is quickly shutdown and rebooted. A reboot upgrade is typically the least preferred option, since it is likely to result in a brief loss of service.

The SUM 1003 may lack knowledge of how to fetch new software, or how to install it onto a boot partition. The SLM 1006 and/or SPM 1004 may have such knowledge.

A watchdog timer 1010 is typically a countdown timer that has an ability to interrupt or reset a processor. As long as the timer is reloaded regularly, it may do nothing. If the system fails to reload the timer within a required time interval, it may generate an interrupt. If the system fails to reload the timer a second time, it may physically reset the CPU.

The watchdog timer 1010 may serve as a basis for fail safe booting mechanisms, and provide an oversight for the HM on each node. The HMs are typically held responsible for reloading the watchdog timer 1010.

A fail-safe reboot mechanism 1007 may use a two-phase commit mechanism for testing new versions to enable an automatic recovery from the installation of a bad version of OS software. Under one preferred embodiment of the fail-safe reboot mechanism 1007, the SPM 1004 does not overwrite a current committed release. When the SUM 1003 instructs a node to reboot under a new release, the new release is not yet committed. If the new release is defective and results in the node becoming non-responsive, the watchdog timer 1010 would eventually force the node to reboot. When the node rebooted, it would not reboot the defective new release again, but rather would automatically fall back to the last committed release. Only after a complete cluster has been constituted and proven under the new release, would the new release be committed. As a result, this embodiment would enable the HA platform to recover, even from a bad OS version, with little or no site visit or operator intervention.

Analyzing core dumps may be the only way to track down some problems, but this can be a difficult way to learn what a system was doing. The black-box recorder 1002 may be used to enable applications to record a high-level record of their recent activities. In the event of an application failure, a black-box record may be automatically forwarded to a central management site. When the system reboots after a crash, an old black-box record may also be retrieved from memory, and forwarded to a central management site. By reviewing black-box records maintained by the black-box recorder 1002, engineers may be able to reconstruct a chain of events that immediately preceded the failure.

The log management mechanism 1001 may be used to automatically merge log records from all nodes in a cluster or system into a single cluster log. Specifically, black-box recordings and core dumps may be captured on each individual node, and are then forwarded to a cluster-wide service. A cluster-wide service may replicate them for redundancy, and spool them until they can be transmitted to a central management facility for archival and analysis. The log management mechanism 1001 may be capable of managing many different types of data.

In managing a system, the preferred embodiments discussed above enable coordination of switchovers from primary components to secondary components. The present invention may also allow an external operator to configure, control, and monitor the status of every component in the system, and to manage a large network of such systems in a coherent way from a central facility. Further, an external operator may remove and replace faulty hardware, and perform hardware and software upgrades on a running cluster with no loss of service.

In one embodiment, the present invention may use external management services as a single point of management, through which all components can be managed, and all statistics, alarms, and events are filtered. Such services are preferably highly available, so that the failure of a single node would not result in a loss of an important management state. Further, such services are designed to facilitate management of a system by a wide range of standard management protocols, such as Simple Network Management Protocol ("SNMP"), Hypertext Transfer Protocol ("HTTP")/Extensible Markup Language ("XML"), Common Object Request Broker Architecture ("CORBA") Internet Inter-ORB Protocol ("IIOP"), Java Management Extensions ("JMX") or Remote Method Invocation ("RMI"), while hiding most of the details from the managed components.

External management services may include a management agent. The management agent may be divided into a lower-level cluster information model and a higher-level translation layer. The lower-level cluster information model may closely match the underlying components. The higher-level translation layer or external information model may be used to translate an internal cluster information model into a required external management protocol and information model.

Figure 11:
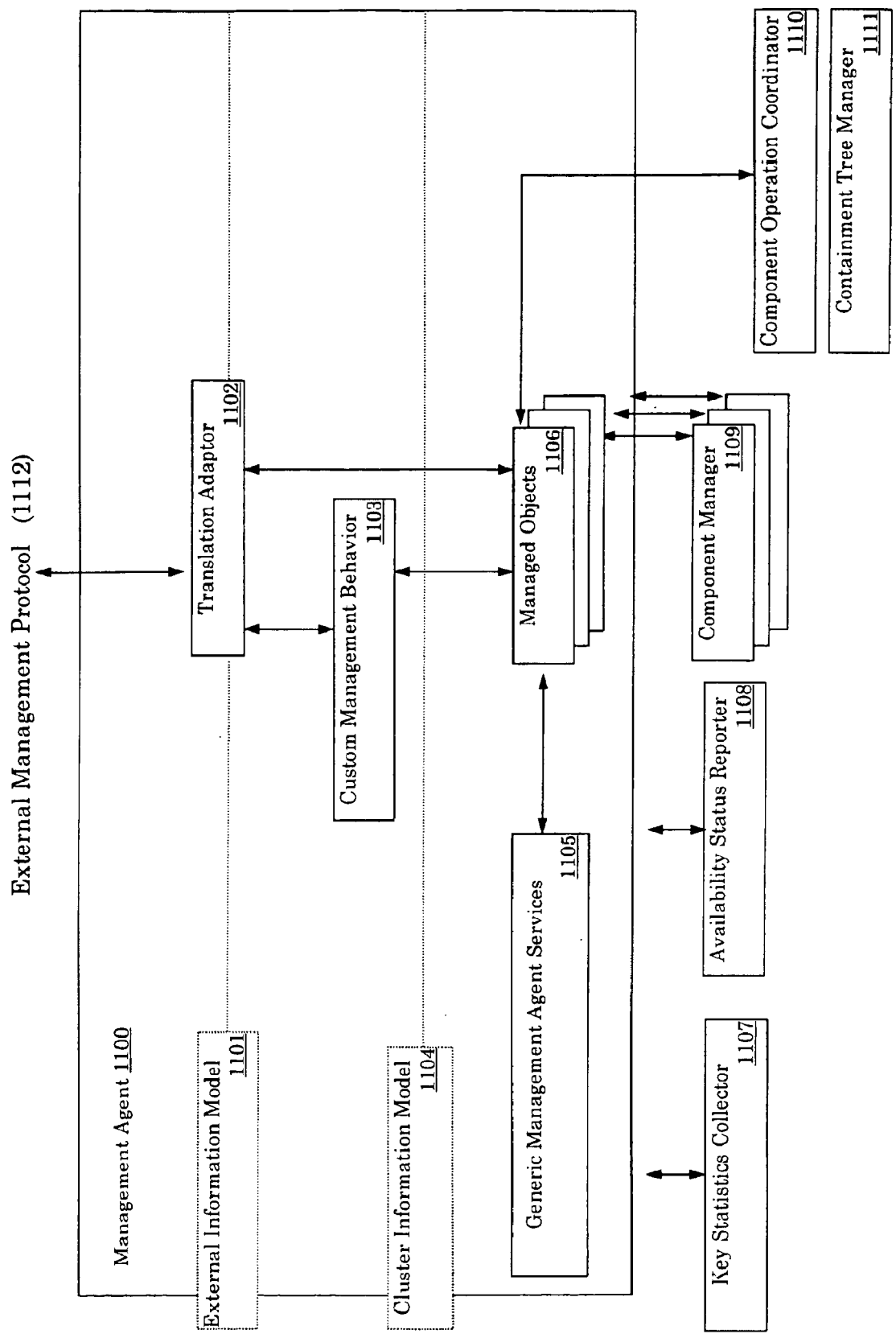
FIG. 11 is a representational diagram showing an overall structure of one embodiment of external management services that may be provided by the present invention.

Once embodiment of external management services is now explained using FIG. 11, which is one representational diagram showing an overall structure of the embodiment.

A management agent 1100 includes an external information model 1101 and a cluster information model 1104. The lower-level cluster information model or cluster information model 1104 may be represented using an object-oriented information model. It may include operations, administration, maintenance and provisioning ("OAM&P") information that is accessible within the management agent 1100.

Within the management agent 1100, the cluster may be viewed as a collection of managed objects 1106 that are mapped onto underlying components. This mapping may be fairly direct, but a single component may be manifested as multiple managed objects. These managed objects 1106 may create OAM&P visible aspects of a component and services provided by the component. Each managed object may interact with a component manager 1109.

Some components may correspond, not to applications or devices, but to platform services. These components may be used to implement platform functionalities including: (1) statistics collection, thresholds, storage and transmission; (2) availability statistics reporting; (3) log file spooling, replication, transmission, and management; (4) software load management; (5) software propagation management; and/or (6) software upgrade management.

The managed objects 1106 may be instantiated as M-beans within a Java Dynamic Management Kit ("JDMK") framework, which may act as the management agent. These M-beans may opaquely encapsulate interactions between the management agent and the underlying components. Beneath the abstraction of the M-beans, may be remote procedure call ("RPC") protocols that are automatically generated from Meta Object Facility ("MOF") descriptions of the managed objects.

These M-beans in conjunction with generic management agent services 1105 may comprise the cluster information model 1104. The external information model 1101 may be implemented on top of the cluster information model 1104.

The external information model may require behavior that is not directly implemented by the underlying components. Examples include averaging of statistics from multiple components or the creation of an aggregate alarm summary. This additional functionality may be implemented within the management agent 1100. Some of this functionality may be unique to a particular external information model. Other functions may be common and applicable to a wide range of external management protocols and information models.

The generic management agent services 1105 may provide additional functionalities that are not directly implemented by the underlying components. An HA platform of the present invention may include a rich set of commonly required services to facilitate the construction of a translator between the cluster information model 1104 and the external information model 1101, and to augment management information provided by the components. Such services may include: (1) managed object grouping and operation scoping; (2) thresholds on attributes of managed objects; (3) event/alarm registration, filtering, processing, manipulation, query/summarization, queuing, and replication; (4) scheduling management behavior for periodic execution; and (5) specific queries on managed object attributes, such as state variables. The common framework may also contain functions to support selected external management protocols such as an object to Management Information Base ("MIB") translation.

Different customers may use very different mechanisms to manage their networks. One customer may choose to use SNMP while another may choose Common Management Information Protocol ("CMIP"), HTTP/XML, or RMI. A translation adapter 1102 that runs within the management agent 1100 may perform the translation between the cluster information model 1104 and the external information model 1101. Each different external management protocol 1112 and/or management information model 1101 may require a different translation adapter. The base platform may include the translation adapter 1102 that directly exposes the cluster information model 1104 through HTTP and RMI.

Beyond the general information mapping and protocol translation, the external information model may require an implementation of more complex policies and operation sequencing. This may be accommodated by adding one or more optional custom management behavior M-beans 1103 between the cluster information model 1104 and the translation adapter 1102.

This layer may consolidate and aggregate the behavior of objects in the cluster information model 1104 to create entirely different objects. For example, the statistics from multiple internal objects may be averaged to create a simulated aggregate object. It could also implement alarm filtering and management policies that may not be obtainable from the alarm objects in generic management agent services.

A key statistics collector 1107 may run on each node in the cluster, extracting statistics from components on that node, filtering them according to configured guidelines, and forwarding them to a log, statistics, and core dump manager for replication and spooling.

A containment tree manager 1111 may be used to keep track of a containment tree and basic information about existing components. When creating a new component instance, the new component instance may be added to a containment tree. When destroying a component, the destroyed component instance may be removed from the containment tree.

A containment tree may be used to capture physical containment relationships among components. Examples of physical containment relationships include: (1) a CPU card that is plugged into a shelf is contained by the shelf; (2) an ethernet controller on a system board is contained by that card; and (3) an application instance running on a particular node is contained by that node. Besides these examples, there are many other containment relationships.

More formally, the following may hold true for each component: (1) each component appears exactly once in a containment tree; (2) each component has exactly one parent; and (3) if a parent component is physically removed from a system, all components under that parent have also been removed.

A containment tree may be used as a basis for generating unique, persistent names for components. Component names are distinguishable from service names-component names persistently and uniquely identify each instance of each component class, while service names are registered in a CNS and are bound to whatever component instance happens to be performing a particular service at a particular moment.

The component operation coordinator ("COpCo") 1110 may be used to arbitrate conflicts among components. There are a variety of scenarios that may lead to conflicts. For example, components may support a set of operations that could interfere with the cluster's ability to provide its service, such as diagnostics, reset, power-off, and reboot. It may be possible for seemingly independent operations to conflict with one another—an operator might issue a command to power-off a shelf that is in the middle of a split-mode upgrade, for example. The COpCo 1110 may arbitrate these and other conflicts, and thus prevent potential deadlocks.

In a preferred embodiment, commands that have a potential to affect services may be issued to and through the COpCo 1110. The COpCo 110 may operate to: (1) recognize operations that might affect multiple components and lock an affected sub-tree before attempting to perform them; (2) sequence successive commands, recognize potentially conflicting commands, and implement appropriate arbitration and/or preemption policies; (3) recognize commands that are implemented in terms of multiple operations, successively issue and track individual operations, and report on an overall success or failure; (4) recognize commands that are applied to a sub-tree of components, and walk the containment tree, invoking right operations on right sub-components in the right order; and/or (5) ensure that operations that might involve changes in an availability management state (i.e., primary, secondary, spare, and off-line) are performed through a CRIM before any other availability impacting operations are initiated.

One may designate the COpCo 1110 to be the only entity, other than the CRIM, that is allowed to issue potentially availability-affecting commands to a component. Responsibilities to issue potentially availability-affecting commands may be divided between the COpCo 1110 and a CRIM. For example, the CRIM may be made solely responsible for taking a component off-line, while the COpCo 1110 may be made solely responsible for resetting and restarting a component.

As discussed above, the present invention works with a wide range of existing operating systems. As such, it may use services provided by existing operating systems such as remote management and debugging tools, hot-swap support, logging facilities, process resource monitoring, robust resource management and panic elimination, device driver hardening features, run-time audits and monitoring of the OS health, and OS fault handling hooks.

APIs may be used in a preferred embodiment of the present invention to increase its portability and reusability. A wide range of platforms supports a common set of availability management paradigms and APIs. This common set of APIs allows applications to be used in a wide range of products with little or no modification. It also allows features of the applications to be moved between central and more remote nodes of the network. The present invention may use the common set of APIs so that it can be used with a wide range of platforms to achieve a desired availability and performance. The use of APIs also facilitates communication with a variety of applications, allowing the applications to directly participate in availability management activities, such as checkpointing, health-monitoring, and fault-recovery, without understanding the redundancy model and fail-over policies.

The above description of the preferred embodiments has been given by way of examples. From the disclosure given, those skilled in the art will not only understand the present invention and its attendant advantages, but will also find apparent various changes and modifications to the structures disclosed. It is sought, therefore, to cover all such changes and modifications as they fall within the spirit and scope of the invention, as defined by the appended claims and their equivalents.

What is claimed is:

1. A method for achieving high availability in a networked computer system, the networked computer system including a plurality of nodes connected by a network, the method comprising:

using a plurality of components to each represent a set of hardware and software in the networked computer system, wherein the plurality of components are high-availability aware;

maintaining a desired level or levels of redundancy comprising assigning at least one of the plurality of components to provide a service within the networked computer system;

assigning operating states to the assigned components;

detecting failure of or request for change of state from one of the assigned components; and modifying the assigned operating states including a state of the one of the assigned components associated with the detected failure or the detected request for change of state.

2. The method of claim 1, wherein the maintaining step further comprises:

recovering from a failure of a component of the plurality of components.

3. The method of claim 1, wherein the maintaining step further comprises:

recovering from a failure of a node of the plurality of nodes.

4. The method of claim 1, wherein the maintaining step further comprises:

migrating a component of the plurality of components from one node to another node in the plurality of nodes when appropriate.

5. The method of claim 1, wherein the maintaining step further comprises:

detecting a component failure among the plurality of components;

reporting the component failure when appropriate; and conducting a component failure recovery procedure.

6. The method of claim 1, wherein the maintaining step further comprises:

detecting a node failure among the plurality of nodes;

reporting the node failure when appropriate; and conducting a node failure recovery procedure.

7. The method of claim 1, wherein the maintaining step further comprises:

providing checkpoint services;

monitoring health of the plurality of components, wherein the detecting failure is based on the health monitoring;

recovering from the component failure using checkpoint information.

8. The method of claim 7, wherein the operating states of the plurality of components include off-line, spare, secondary, and primary.

9. The method of claim 7, wherein the recovering step further comprises:

isolating a cause of the component failure; and applying a failure recovery procedure to address the cause.

10. The method of claim 1, wherein the plurality of nodes may belong to different software release domains, and wherein the maintaining step is capable of taking into account the different software release domains.

11. The method of claim 10, wherein information regarding the different software release domains is used to conduct a software upgrade.

12. The method of claim 1, wherein the maintaining step takes into account load information.

13. The method of claim 1, wherein application programming interfaces are used in the using and maintaining steps.

14. The method of claim 1, wherein the method does not change depending on hardware or software architecture of the networked computer system.

15. The method of claim 1, wherein the desired level or levels of redundancy include 2N, N+1, load-sharing, hot-standby, and warm-standby.

16. A method for achieving high availability in a networked computer system, the networked computer system including a plurality of nodes connected by a network, the method comprising:

using a plurality of components in each of the plurality of nodes to represent hardware and software in the networked computer system, wherein the plurality of components are high-availability aware;

managing the plurality of components to achieve a desired level or levels of redundancy;

monitoring health of the networked computer system, including health of the plurality of components and health of the plurality of nodes;

detecting a failure in the networked computer system, including a failure of a component in the plurality of components and a failure of a node in the plurality of nodes;

recovering from the failures by performing appropriate failure recovery procedure; and migrating one of the plurality of components from one node to another node in the plurality of nodes.

17. The method of claim 16, further comprising:

reporting the health of the networked computer system.

18. The method of claim 16, further comprising:
reporting the failure of the networked computer system.

19. The method of claim 16, wherein the monitoring step cooperates with the component management step.

20. The method of claim 16, wherein the detecting step further comprises:
isolating a cause of the failure,
wherein the appropriate failure recovery procedure addresses the cause identified by the isolating step.

21. The method of claim 16, further comprising:
cooperating with external management services and an operating system of the networked computer system.

22. A system for making a networked computer system highly available, wherein the networked computer system includes a plurality of nodes connected by a network, the system comprising:
means for using a plurality of components to each represent a set of hardware and software in the networked computer system, wherein the plurality of components are high-availability aware;
means for maintaining a desired level or levels of redundancy comprising assigning at least one of the plurality of components to provide a service within the networked computer system;
means for assigning operating states to the assigned components;
means for detecting failure of or request for change of state from one of the assigned components; and
means for modifying the assigned operating states including a state of the one of the assigned components associated with the detected failure or the detected request for change of state.

23. A system for making a networked computer system highly available, wherein the networked computer system includes a plurality of nodes connected by a network, the system comprising:
means for using a plurality of components in each of the plurality of nodes to represent hardware and software in the networked computer system, wherein the plurality of components are high-availability aware;
means for managing the plurality of components to achieve a desired level or levels of redundancy;
means for monitoring health of the networked computer system, including health of the plurality of components and health of the plurality of nodes;
means for detecting a failure in the networked computer system, including a failure of a component in the plurality of components and a failure of a node in the plurality of nodes;
means for recovering from the failures by performing appropriate fault recovery procedure; and
means for migrating one of the plurality of components from one node to another node in the plurality of nodes.

24. A computer program product configured to achieve high availability in a networked computer system, the networked computer system including a plurality of nodes connected by a network, the computer program product comprising:
computer readable program code configured to create a plurality of components to each represent a set of hardware and software in the networked computer system, wherein the plurality of components are high-availability aware;
computer readable program code configured to maintain a desired level or levels of redundancy of the plurality of components, the maintaining comprising assigning at least one of the plurality of components to provide a service;
computer readable program code configured to assign operating states to the assigned components;
computer readable program code configured to detect failure of one of the assigned components;
computer readable program code configured to detect the assigned operating states including a state of the one of the assigned components associated with the detected failure; and
a computer readable medium having the computer readable program codes embodied therein.

25. A computer program product configured to achieve high availability in a networked computer system, the networked computer system including a plurality of nodes connected by a network, the computer program product comprising:
computer readable program code configured to use a plurality of components in at least some of the nodes to represent hardware and software in the networked computer system, wherein the plurality of components are high-availability aware;
computer readable program code configured to manage the plurality of components to achieve a desired level or levels of redundancy;
computer readable program code configured to monitor health of the networked computer system, including health of the plurality of components and health of the plurality of nodes;
computer readable program code configured to detect a failure in the networked computer system, including a failure of a component in the plurality of components and a failure of a node in the plurality of nodes;
computer readable program code configured to recover from the failures by performing appropriate failure recovery procedure;
computer readable program code configured to migrate one of the plurality or components from one of the plurality of nodes to another one of the plurality of nodes; and
a computer readable medium having the computer readable program codes embodied therein.

* * * * *

UNITED STATES PATENT AND TRADEMARK OFFICE
CERTIFICATE OF CORRECTION

PATENT NO. : 6,854,069 B2
DATED : February 8, 2005
INVENTOR(S) : Mark A. Kampe et al.

It is certified that error appears in the above-identified patent and that said Letters Patent is hereby corrected as shown below:

Column 26,
Line 18, "detect" should be -- modify --
Line 49, "or" should be -- of --

Signed and Sealed this

Twenty-fourth Day of May, 2005

JON W. DUDAS
*Director of the United States Patent and Trademark Office*